March 15, 1949.   S. KARASICK   2,464,317
COMBINED MAGNETIC CHUCK AND MACHINE TOOL
Original Filed Sept. 6, 1940   2 Sheets-Sheet 1

INVENTOR
SAMUEL KARASICK
BY
D. Clyde Jones
ATTORNEY

March 15, 1949.　　　　S. KARASICK　　　　2,464,317
COMBINED MAGNETIC CHUCK AND MACHINE TOOL
Original Filed Sept. 6, 1940　　　　2 Sheets-Sheet 2
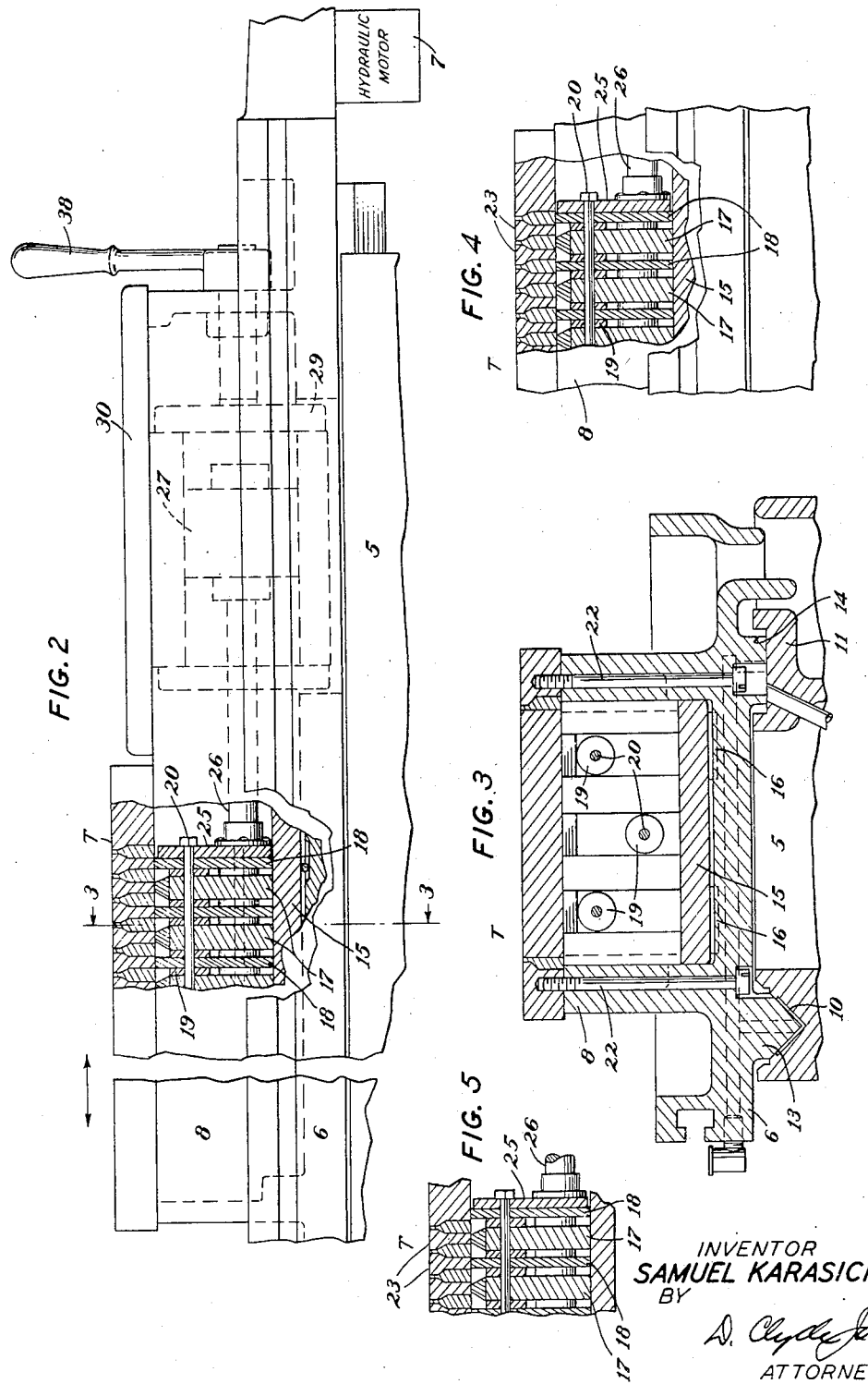

Patented Mar. 15, 1949

2,464,317

UNITED STATES PATENT OFFICE 2,464,317

COMBINED MAGNETIC CHUCK AND MACHINE TOOL

Samuel Karasick, Great Barrington, Mass.; Mary K. Karasick executrix of said Samuel Karasick, deceased Original application September 6, 1940, Serial No. 355,663, now Patent No. 2,376,150, dated May 15, 1945. Divided and this application April 18, 1945, Serial No. 588,958

3 Claims. (Cl. 51—231)

This invention relates to a combined magnetic chuck and machine tool.

In various types of machine tools, it is customary to use a detachable magnetic chuck to retain workpieces in position while they are being machined. This is especially true of surface grinders although the invention is not limited to that type of machine tool. When a detachable magnetic chuck is mounted on the table of a surface grinder, the height of the chuck appreciably limits the height of workpieces that can be introduced between the lower surface of the grinding element and the top surface of the chuck.

In accordance with one feature of the present invention, the casting of the sliding table of a surface grinder is combined with the framework of the chuck to secure an appreciable increase in the height of workpieces that can be received by the grinder, since the resulting vertical clearance between the work surface of the present built-in chuck and the related grinding surface, is greater than the corresponding clearance in a surface grinder in which a separate unit is bolted to the grinder table.

When a detachable chuck is clamped on an ordinary grinder, the necessary clamping bolts, strain the chuck and table sufficiently so that it is necessary to take a grinding cut from the work-holding surface of the chuck to provide a true surface. Such a grinding cut may have to be repeated several times as the strains are relieved. A further important advantage of the present invention therefore results from the fact that the chuck cannot be removed, so that the necessity for frequent regrinding of the work-holding surface of the chuck after each removal, is avoided.

Other features and advantages will appear from the detailed description and claims when taken with the drawings in which:

Figs. 1 and 2 respectively are a plan view and a side elevation of one form of the chuck of the present invention, certain parts thereof being broken away for clearness in illustration;

Fig. 3 is a vertical section through this chuck taken substantially on the line 3—3 of Fig. 2;

Fig. 4 is a fragmentary side elevation similar to Fig. 2 except that the poles of the chuck are illustrated in a neutralizing position; and Fig. 5 is a fragmentary side elevation similar to Figs. 2 and 4 except that the poles of the chuck are illustrated in a flux reversing position.

Figure 1:
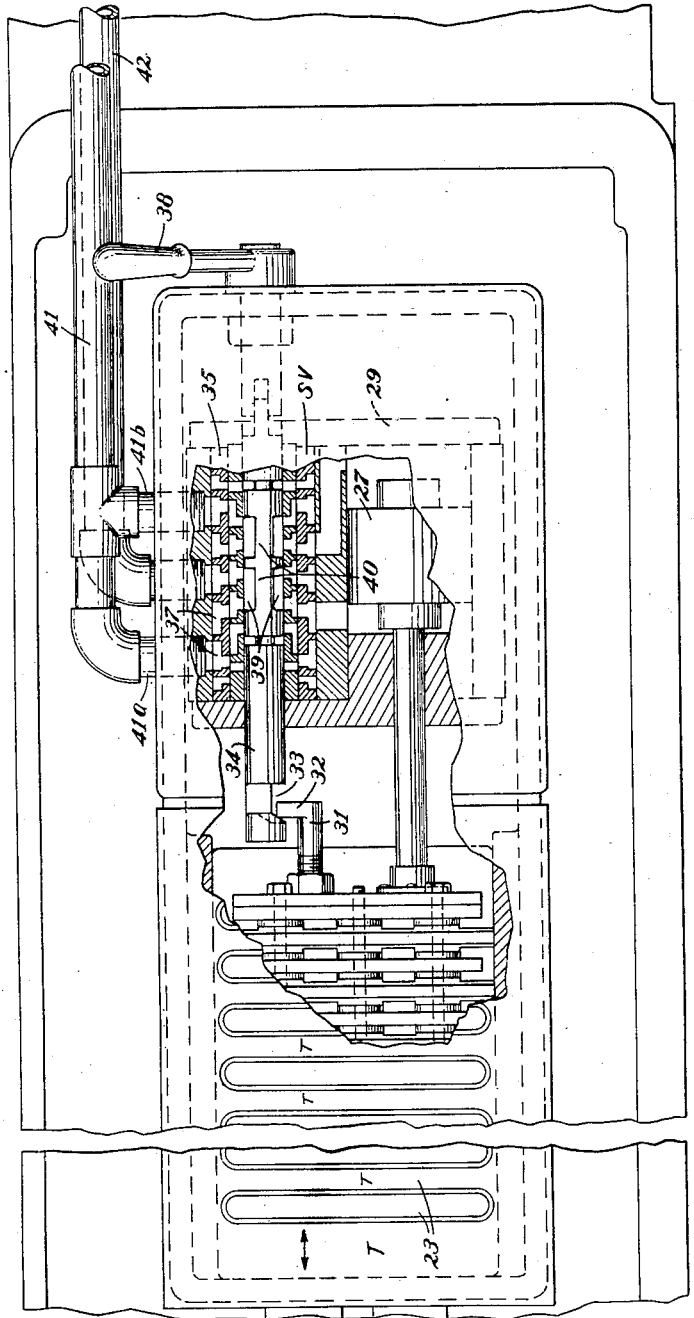

The present invention comprises the combination of a built-in magnetic chuck and a machine tool wherein a work-piece is securely held while it is being machined. By way of example, the chuck is shown as incorporated in a surface grinding machine of the well-known type including a frame 5 which carries a table 6 adapted to be reciprocated longitudinally thereon at right angles to the axis of a grinding wheel (not shown), by a motor 7 of any suitable type, such as a hydraulic motor operated by oil under pressure as more fully disclosed in U. S. Patent #2,161,216 issued to W. H. Wood. The magnetic assembly of this chuck is mounted for reciprocation, with the table, along the longitudinal axis of the chuck's work support and the table as will be more fully set forth. The present chuck forms a part of the table of the grinder thereby obviating the need of clamping the chuck to the table. It will be appreciated that where the chuck is clamped to the table, strains are introduced into the work surface of the chuck so that it is necessary to grind it in order to have a true surface for supporting the work to be ground.

The chuck comprises a hollow, open-topped, rectangular casing 8 cast integral with the table 6 from suitable non-magnetic material such as aluminum or the like. This casing houses a movable magnetic assembly of the chuck as well as a hydraulic motor for reciprocating the same. The grinder frame 5 is provided with spaced longitudinal guide ways 10 and 11 (Fig. 3). These guide ways receive the spaced ways 13 and 14 integral with the table and extending parallel to the long sides of the casing along the lower corners thereof. A ferromagnetic bottom member 15 of approximately the width of the space within the casing and of a length approximately equal to the holding portion of the chuck, is fixed to the inner bottom surface of the left end portion of the casing as viewed in Figs. 1 and 2, being magnetically insulated therefrom by brass washers 16, if the casing is made of magnetic material. The upper surface of the bottom member 15 is accurately ground smooth for a purpose to be set forth. The bottom member slidably supports the magnetic assembly which includes upwardly extending permanent magnets 17 or other unidirectional flux producing members formed preferably of an alloy known as "Alnico," and upwardly extending soft iron yokes 18, one yoke being interposed between each pair of magnets. The yokes and magnets are separated by non-magnetic spacers 19 being clamped in this relation by the clamping bolts 20, to complete the magnetic assembly, the lower surface of which is ground smooth to slide on the smooth upper surface of the bottom member with a negligible air gap therebetween. It will be understood that the magnets extend transversely of the casing and are approximately equal in length to the width of the space therein. The magnets 17 are so arranged that their upper ends constitute North poles while the upper ends of the yokes 18 interposed therebetween constitute South poles. Thus the yokes and the bottom member constitute return flux paths for the lower ends or South poles of the "Alnico" magnets. The magnets are tapered at their upper ends and they are made relatively short due to the high reluctance of "Alnico" which necessitates that the magnets be about three times as large in cross section as the return yoke (Figs. 2 and 4). It is preferred to make the tapered upper ends of the magnets 17 of a separate piece of soft Norway iron brazed to the "Alnico" portion of the magnet proper. This construction is indicated in Figs. 2, 4 and 5 by the cross-hatching of the magnet. It will be understood that this use of soft iron results in increased holding power over the construction where the tapered portions of the magnets are also made of "Alnico."

The top of the chuck portion of the casing is closed by a top plate or work table T, this table being adapted to be secured to the upwardly extending sides of the casing by suitable fastening screws 22. The table T as well as the pole pieces 23 mounted therein are made of ferromagnetic material, preferably laminated, to constitute pole-pieces. These pole-pieces extend transversely of the top plate, being spaced from each other by suitable non-magnetic material cast therein. The space between the lower surfaces of the pole-pieces is equal to the space between the magnets 17 and the yokes 18. The pole pieces are of the cross section illustrated in Figs. 2 and 4, having relatively wide upper surfaces but relatively narrow lower surfaces substantially equal to the width of the upper surfaces of the yokes and the upper surfaces of the tapered magnets. It will be understood that this cross-sectional shape of the pole-pieces 23 reduces flux leakage across the space between the pole-pieces and causes a greater part of the flux due to the permanent magnets to issue from the upper or workholding surface of the top plate. The lower surfaces of the pole-pieces, as well as the upper surfaces of the magnets and yokes, are accurately ground so that there is a negligible air gap between these parts.

The right end of the magnetic assembly as illustrated in Figs. 2 and 4 has fastened thereto by the clamping bolts, a plate 25 to which there is secured the piston rod 26 carried by the piston 27 of a hydraulic motor 29. This motor is housed in the right hand portion of the casing 8, being covered by a top member 30, which with the table T completes the closure of the casing. The plate 25 also supports a valve actuating rod 31 which rod is provided with a lug 32 extending into a notch 33 in the valve stem 34 of a suitable slide valve mechanism SV. The slide valve mechanism includes a hollow cylindrical member 35 within which the valve stem 34 reciprocates with a close fit. The cylindrical member has oil ports 37 through which oil is supplied to the motor 29 under the control of the valve stem 34. The valve stem which is rotatable by the handle 38, is cut away to provide passages 39 partially encircling the stem but leaving parts 40 of its surface intact. The parts 40 close the oil ports 37 on the oil supply side when the handle 38 is rotated from the motor-operating position shown in Fig. 1 to the motor-stopping position. This hydraulic motor with its slide valve mechanism may be similar to that disclosed in the mentioned Patent #2,161,216.

In the operation of this motor, oil under pressure is supplied through the oil line 41 and passes through either the branch pipe 41a or the branch pipe 41b, under the control of the slide valve mechanism SV, either to the right hand surface or to the left hand surface of the piston 27 depending on the position of the slide valve. The oil ahead of the piston flows away through the exhaust pipe 42. Thus when the oil is supplied through the branch 41a to the left hand face of the piston, it moves toward the right of Fig. 1 carrying with it the magnetic assembly of the chuck. When the piston reaches the right-hand end of its stroke, the lug 32 on the actuating rod 31 moves the slide valve mechanism so that oil is now supplied through the branch pipe 41b to the right-hand surface of the piston. The piston as well as the magnetic assembly are then moved toward the left until the lug 32 on the actuating rod 31, shifts the slide valve so that oil is now introduced into the motor through the branch pipe 41a. This reciprocation of the piston and the magnetic assembly is continued until the handle or throttle 38 is positioned to shut off the oil supply from both surfaces of the piston, thereby stopping its operation. It will be appreciated that the handle controls the slide valve to open or close the oil supply lines. This permits the stopping of the motor at any point in its travel. It will be understood that when the motor has shifted the magnetic assembly to the position illustrated in Fig. 2, the chuck is in a condition to retain work thereon. However, when the handle 38 is moved to a position so that the magnetic assembly is reciprocated by the hydraulic motor 29 between the position shown in Fig. 2 and the position shown in Fig. 5, the flux through the work piece will be alternately reversed with an interval of complete neutralization between each reversal. This interval of complete neutralization occurs when the magnetic assembly is in substantially the position shown in Fig. 4. During this reversal of the flux through the work piece, this piece is withdrawn from the table of the chuck along the top surface thereof.

This application is a division of applicant's Patent No. 2,376,150, granted May 15, 1945, relating to Magnetic Devices.

What I claim is:

1. In a machine tool having a base, parallel slideways on said base, a hollow longitudinally movable work table having integral parallel slideways which mate with said base ways, said table having an aperture therein, a work supporting platen closing the top of said aperture, said platen having a plurality of spaced parallel polepieces fixedly mounted therein, a longitudinally movable magnet assembly within the table having a plurality of spaced parallel poles arranged in operative relation with said polepieces, and a motor mounted within said work table to reciprocate said magnet assembly relative to said table to facilitate loading and unloading of work pieces supported thereon.

2. In a machine tool having a base, parallel slideways on said base, a hollow longitudinally movable table having integral parallel slideways which mate with said base ways, said table having an elongated aperture therein, a work supporting platen closing the top of said aperture, said platen having a plurality of spaced parallel polepieces fixedly mounted therein, a longitudinally reciprocable magnet assembly within said table having a plurality of spaced permanent magnets provided with poles arranged in operative relation with said polepieces, means including a fluid pressure actuated mechanism including a cylinder fixedly mounted within said aperture, and a piston slidably mounted therein which is operatively connected to reciprocate said magnet assembly to change the relation of said poles relative to said polepieces to facilitate loading and unloading of work pieces relative to said table.

3. In a machine tool having a base, parallel slideways on said base, a hollow longitudinally reciprocable table having integral parallel slideways which mate with said base ways, said table having an elongated aperture therein, a work supporting platen closing the top of said aperture, said platen having a plurality of spaced parallel polepieces fixedly mounted therein, a longitudinally reciprocable magnet assembly within said table having a plurality of spaced poles arranged in operative relation with said pole pieces, a fluid pressure actuating mechanism including a cylinder fixedly mounted within said table, a piston slidably mounted therein which is operatively connected to move said magnet assembly to shift said magnet poles relative to said polepieces, and a manually operable control valve to control the admission to and exhaust of fluid from said cylinder.

SAMUEL KARASICK.

REFERENCES CITED

The following references are of record in the file of this patent:

UNITED STATES PATENTS

| Number | Name | Date |
|---|---|---|
| 712,871 | Walker | Nov. 4, 1902 |
| 2,053,177 | Bower | Sept. 1, 1936 |
| 2,113,287 | Baldenhofer | Apr. 5, 1938 |
| 2,347,023 | Beechlyn | Apr. 18, 1944 |
| 2,350,229 | Harrington | May 30, 1944 |